3,365,413
POLYVINYL ALCOHOL FILMS PLASTICIZED WITH MONOPHENYL ETHER OF POLYOXYETHYLENE
Leo J. Monaghan and Vincent A. Aliberti, Springfield, and Daniel M. Sullivan, Granby, Mass., assignors, by mesne assignments, to Monsanto Company, a corporation of Delaware
No Drawing. Filed July 23, 1963, Ser. No. 297,075
6 Claims. (Cl. 260—33.2)

This invention relates to the production of polyvinyl alcohol film by a blow-extrusion process. It is more particularly concerned with the production of a completely clear film which is readily soluble in water.

Many of the synthetic resins available on the market have been subjected to blow-extrusion processes for the formation of thin-walled tubes which can be used in that form or which are subsequently slit to give useful film. These processes and products are described in considerable detail in such U.S. Patents as Nos. 2,461,976; 2,461,976; 2,632,206 and so on. This and other related art set out methods which may be generally applicable to many resin plastics but, in some cases, even those highly skilled in the art are unable to apply these teachings to all such materials. This latter observation is especially applicable to polyvinyl alcohol.

Polyvinyl alcohol is a resin with special properties which make it an extremely valuable product for many commercial applications. Among these properties is its rather unusual characteristic of being soluble in cold water. The production of a polyvinyl alcohol film which retains its water solubility is something which is much desired. Cast films of polyvinyl alcohol have been prepared from solutions of the resin but the method involved is rather slow and expensive. In addition, the minimum gauge of film obtainable by the casting method is relatively large.

Unfortunately, the known methods of blow-extrusion cannot be applied to polyvinyl alcohol to give successful products without first being extensively modified. Ordinary practice produces film which may lack flexibility to the extent of being brittle, especially at low temperatures and under conditions of varying humidity. The solubility in water may be impaired to an inoperative degree. The film may have a rough surface. Or it may be covered with holes, bubbles and opaque specks. Attempts to correct these unacceptable defects often result in degradation of the polyvinyl alcohol. An even more important requirement for blow-extrusion is to have a material which will neither be too stiff to extrude nor be so fluid as to resist the feed action of an extruder screw or similar device commonly used for this purpose.

It is an object of this invention to prepare polyvinyl alcohol film by a blow-extrusion process. It is another object to produce a film that will be clear and substantially water soluble. It is a further object of the invention to prepare polyvinyl alcohol compositions which can be extruded easily and at a sufficiently rapid rate to be commercially economical for the production of blown film having the desired characteristics while being, at the same time, free from physical defects. Other objects and advantages of this invention will become apparent to those skilled in the art in the course of the description that follows.

These and other objects are attained by the present invention which provides for the blow-extrusion of polyvinyl alcohol compositions of special types and properties. Parts and percentages, unless otherwise designated, are by weight.

Polyvinyl alcohol of commerce is usually prepared by the hydrolysis of a polyvinyl ester, most commonly polyvinyl acetate. The hydrolysis is carried out in either an acid or alkaline medium and, for the present invention, it is desirable that the hydrolysis be not carried to completion. For best results in the blowing of film, the polyvinyl alcohol should contain about 60 to 75% of hydroxyl groups, calculated as polyvinyl alcohol, and 40 to 25% of residual ester groups, calculated as polyvinyl ester, e.g. polyvinyl acetate. Rather than from polyvinyl acetate, the polyvinyl alcohol may be made by hydrolyzing other polyvinyl esters such as polyvinyl formate, propionate, butyrate, hexoate, benzoate, or the like.

For optimum results in blow-extrusion, i.e. in order to obtain a film with reasonable physical properties, it is essential that the polyvinyl alcohol used have a melting point high enough to permit extrusion but not so high as to cause degradation before melting. The presence of degradation products in the film causes badly roughened surfaces and is further evidenced by the appearance of specks of incompatible materials as well as undesirable coloration.

The preferred materials will melt between about 375–425° F. However, by proper adjustment of blowing conditions, it is possible to avoid degradation and to produce a stable bubble with materials having a slightly higher melting point. This can be accomplished by insuring proper cooling through adjustment of the cooling ring air pressure, by varying the height of the melt bubble and by setting the film wind-up rate at an appropriate level. These operations will be clearly explained later.

The melting point of polyvinyl alcohol is a function of its ester content and of its molecular weight. In general, the higher the molecular weight is, the higher the melting point is. The molecular weight of polyvinyl alcohol is in turn related to the viscosity shown by its aqueous solutions. This relationship is therefore conveniently used as a measure of the relative molecular weight and the corresponding melting point of a given polyvinyl alcohol. The viscosity of standard 4% by weight aqueous solutions of polyvinyl alcohol at 20° C. as determined by means of an Ostwald-Fenske viscosimeter is generally used as a satisfactory indication of these critical parameters. For the purpose of the present invention then, it has been found that polyvinyl alcohols with a standard viscosity of 4 to 12.5 centipoises as 4% aqueous solutions at 20° C. will have the melting point range preferred. On the other hand, materials having viscosities as high as about 45 centipoises can be employed with acceptable results since, as intimated earlier, the blow-extrusion equipment is capable of sufficient adjustment to accommodate such materials. The lower limits of the stated viscosity range also reflects the low temperature impact and tensile strength of the film products in that satisfactory properties are difficult to obtain beyond that range In order to use polyvinyl alcohol in a blow-extrusion process, it is necessary that the polyvinyl alcohol be properly plasticized. This facilitates extrusion without exceeding temperature at which degradation of the polyvinyl alcohol occurs, for instance at about 420° F. It helps to control the viscosity of the melted polyvinyl alcohol during extrusion so that the material will be neither too stiff nor too runny and will be capable not only of being extruded but also of being blown into a bubble which will not collapse before it is flattened and slit into film. This melt viscosity, at normal shear rates produced in commercial extrusion dies, can vary between about 100 to 20,000 poises; however, for best handling and results, the viscosity of the melt should be within the preferred range of about 200 to about 2000 poises. Care must be taken to use compatible plasticizers which will not introduce into the melt volatile materials which cause the formation of holes and bubbles in the extruded film.

Difficulties are encountered when substances such as glycerine, ethylene glycol, sorbitol and the like, which are commonly used as plasticizers for polyvinyl alcohol, are employed for plasticizing blow extrusion preparations. They require water for their plasticizing action, yet moisture must be avoided in the extrudable compositions of this invention; if present at all, it should constitute less than 0.5% of the weight of the extrudable composition, although it is possible to blow-extrude certain compositions containing up to about 1.0% by weight of volatile material by increasing the air cooling rate of the blown film, decreasing the blow-up ratio, and so on. When glycerine is used to plasticize a low acetate polyvinyl alcohol, then, a stiff melt is obtained which is rather difficult to blow. With higher acetate resins such as the ones favored in this invention, the use of glycerine as a plasticizer afflicts the resulting film with a pronounced tendency to block, i.e. to stick to itself, and seriously impairs its low temperature impact resistance. This is not to say that the glycerine type of plasticizer is entirely excluded from the practices of this invention. By using from about 15 to about 25 parts of glycerine with 100 parts of low acetate polyvinyl alcohol, it is possible to obtain film with satisfactory properties if the glycerine has a very low moisture content and precautions are taken to avoid the picking up of moisture from the ambient atmosphere during the blow-extrusion process, and if the blow-up ratio of the extruded plastic tube is kept relatively low, say not higher than 2:1 and the cooling of the bubble is done at a rather slow rate, by using hot air for instance. Extrudable compositions made primarily of the preferred high acetate polyvinyl alcohols that have already been described can also contain advantageously, as shall be shown, a certain amount of more or less completely hydrolyzed polyvinyl ester plasticized with a dry glycerine type material. In such cases, once the film is formed and the process limitations no longer operate, the plasticizing action is restored to the additives as the film is exposed to atmospheric moisture.

The plasticizer content of the extrudable composition can vary between 10 and 40 parts per 100 parts of resin. Below this range, the compositions generally too stiff for ready extrusion and/or blowing, and above these limits, the melt has insufficient strength to be formed into a bubble. It is also the case that excessive amounts of plasticizer in the composition may so lubricate the extrusion screw that insufficient feed is obtained and, in some case, feed may even stop completely.

Subject to the requirements and limitations set forth above, many suitable plasticizers are available which are compatible with polyvinyl alcohol and are relatively non-volatile at extrusion temperature. Among the compounds of this class, the most satisfactory with respect to the blow-extrusion requirements and film properties are the monophenyl ethers of polyoxyethylene containing from 2 to about 7 ethylene oxide units per molecule. These ethers are available commercially as mixtures (Pycal); those mixtures having an average ethylene oxide content of about 4 units per molecule are preferred. More typical polyvinyl alcohol plasticizers may also be used, but preferably in conjunction with the Pycal type of compound just described. Included in this class are ethylene oxide derivatives of furfuralcohol containing about 3 to 12 moles of ethylene oxide per molecule, ethoxylated derivatives of urea (Nopco GS-5) and of tetrahydrofurfuryl alcohol, tributyl phosphate, tributoxyethyl phosphate, dimethylformamide, ethanol foramide, trimethylol propane, and so on. In most instances, compositions comprising these plasticizers can be extruded but they will often yield, however, film with a tendency to block and of poorer impact properties at low temperatures and under low relative humidity conditions.

The polyvinyl alcohol, the plasticizer and the extrudable composition should be relatively free of inorganic salts so that the ash content preferably does not exceed 1.0%. A pH range of 5 to 6.5 is preferable for the compositions. Alternatively, a higher ash content is permissible provided that such ash, consists of neutral salts. These conditions can be met by employing thoroughly washed polyvinyl alcohols or polyvinyl ester hydrolyzates which have been neutralized with phosphoric acid or organic acids of the citric, malic and tartaric type. Inorganic phosphates capable of neutralizing polyvinyl alcohol obtained by acid hydrolysis may also be used to achieve the desired pH range.

Antioxidants in small amounts are sometimes used in the compositions to minimize thermal degradation. The compounds that are preferred for accomplishing this function should have a measure of water solubility and should be reducing agents. A list of typical compounds in this category includes butylated hydroxyanisole (Tenox BHA), butylated hydroxytoluene (Tenox BHT), sodium benzoate, calcium stearate, lactose, as well as salts of copper, nickel, cobalt and tin. From 0.2 to 2.0% of said compounds may be used.

Lubricants and anti-sticking agents may be added to the formulations in certain cases to facilitate extrusion and help prevent tackiness of film. These slip agents are low molecular weight materials which are incompatible or semi-incompatible with the resin. They migrate or bloom to the surface of the material thus reducing the coefficient of friction and improving the machinability of the film. Examples of such slip agents are AC Polyethylene 8416, a low molecular weight polyethylene, and long chain aliphatic nitrogen products such as "RAM." Up to 2.0% of the extrudable compositions may be constituted by said materials.

The extrudable mix should preferably have, as mentioned earlier, a melting point below 425° F. and also within a range of 20° F. for optimum operational characteristics. The melt formed should be homogeneous, free from particles of degraded polymer and of such consistency and strength as to be readily formed into a bubble several times the extrusion die diameter and to orient the blown film. The nature of the melt should also be such that a reasonable temperature interval of operation is attained without being subject to adverse effects from slight temperature variations.

The solid composition to be fed into the extrusion screw or the like should preferably have a relatively narrow particle size spread and should have a relatively high bulk density so as to avoid excessive entrainment of air. This air is liable to build up in the extruder and cause undesirable fluctuations in the rate of feed of the melt to the extrusion die. By using the defined polyvinyl alcohol and plasticizer compositions of the nature and in the ranges set forth above, the extruder can feed the melt uniformly to the die and thus form a bubble and film of outstanding properties and commercial utility.

The invention is illustrated in further detail in the examples that follow.

*Example 1*

One hundred parts of a dry, granulated phosphoric acid neutralized polyvinyl alcohol containing 29% residual acetate groups, calculated as polyvinyl acetate, and having a 4% aqueous solution viscosity of about 11 centipoises at 20° C. was mixed in a Banbury mixer with 20 parts of Pycal 94, a plasticizer which is a phenolic ether of a polyoxyalkylene containing an average of five ethylene oxide units per molecule. The mixture was granulated and pelletized by conventional methods. The moisture content was less than 0.1% by weight.

It was then fed into an extruder and die system of the type described earlier. The particular extruder used here had a barrel bore of 1½ inch, a barrel length to diameter ratio of 20:1 and was equipped with a polyethylene type screw having a 3.7:1 compression ratio. The Hartig type die had an annular slot with a four-inch diameter.

The following conditions were used for extrusion:

| | |
|---|---:|
| Extruder screw speed _____ r.p.m__ | 60 |
| Temperatures: | |
|   Feed hopper _____ °F__ | 50 |
|   Heater zone I _____ °F__ | 350 |
|   Heater zone II _____ °F__ | 350 |
|   Die ring heater _____ °F__ | 325 |
|   Die collar heater _____ °F__ | 350 |
| Die slot opening _____ mils__ | 40 |
| Blow-up ratio _____ | 2.1:1 |
| Film thickness (double layer) _____ mils__ | 3 |
| Cooling ring air pressure _____ in. water__ | 0.51 |
| Wind-up speed _____ ft./min__ | 20 |

There was thus produced a 1.5 mil film which was water-soluble, clear, uniform, colorless, free of defects and chlorine resistant.

*Example 2*

There was then produced another completely acceptable film with the same resin-plasticizer mix in the same equipment and under the same conditions as in Example 1, with the exception that the wind-up speed was stepped up to 122 feet per minute. As a result, a film thickness of 0.25 mils was obtained.

*Example 3*

In this preparation, a plasticized polyvinyl alcohol was made by adding the plasticizer to polyvinyl acetate varnish before methanolysis. Enough of the plasticizer of Example 1 was added to yield a final product containing 16.7 parts of the plasticizer per 100 parts resin. The polyvinyl acetate was then batch methanolized to a plastcized polyvinyl alcohol having a residual acetate group content of 38.1%, calculated as polyvinyl acetate, a 4% aqueous solution viscosity of 9.5 centipoises at 20° C., and an ash content of 0.05% by weight, calculated as sodium oxide. The material was then dried, pelletized and extruded through the system used in Example 1, except that the extrusion conditions were changed to the following ones:

| | |
|---|---:|
| Extruder speed _____ r.p.m__ | 30 |
| Temperatures: | |
|   Heater zone I _____ °F__ | 400 |
|   Heater zone II _____ °F__ | 395 |
|   Die ring heater _____ °F__ | 350 |
|   Die collar heater _____ °F__ | 355 |
| Die slot opening _____ mils__ | 20 |
| Blow-up ratio _____ | 1.5:1 |
| Film thickness (double layer) _____ mils__ | 1.5 |
| Cooling ring air pressure _____ in. water__ | 0.51 |
| Wind-up speed _____ ft./min__ | 40 |

The film thus obtained was found satisfactory in all relevant respects.

*Example 4*

The following run was made on a 1.5 inch extruder having a barrel length to diameter ratio of 20:1 and a screw with a 1:1 compression ratio. The plasticized feed was made by adding enough Pycal 94 to a continuous process polyvinyl acetate methanolysis system, so that the resulting polyvinyl alcohol contained 10 parts of the plasticizer per 100 parts of resin. Sodium dihydrogen phosphate are used to neutralize the resin catalyst. The resin emerging from the continuous methanolysis process had a residual polyvinyl acetate content of 39% and a 4% aqueous solution viscosity of 7.5 centipoises at 20° C. One-half percent of a slip agent, "Slip-eze," was added to the dry unpelletized resin to improve the friction coefficient of the film. Extrusion conditions were as follows:

| | |
|---|---:|
| Extruder speed _____ r.p.m__ | 40 |
| Temperatures: | |
|   Hopper (cold) | |
|   Heat zone I _____ °F__ | 300 |
|   Heat zone II _____ °F__ | 355 |
|   Die ring heater _____ °F__ | 325 |
|   Die collar heater _____ °F__ | 315 |
| Die slot opening _____ mils__ | 15 |
| Blow-up ratio _____ | 2.9:1 |
| Film thickness (double layer) _____ mils__ | 1.5 |
| Cooling air pressure _____ in. water__ | 2.0 |
| Wind-up speed _____ ft./min__ | 25 |

*Example 5*

One hundred parts of a polyvinyl alcohol resin containing about 37% of residual acetate groups, calculated as polyvinyl acetate, and having a 4% aqueous solution viscosity of about 9 centipoises at 20° C., was mixed in a Banbury mixer with 35 parts of Pycal 94 and 0.2 parts of butylated hydroxytoluene (Tenox BHT). A separate mixture of 100 parts of an essentially completely hydrolyzed polyvinyl acetate having a 4% aqueous solution viscosity of approximately 15 centipoises at 20° C., with 25 parts of dry glycerine and 1 part of butylated hydroxytoluene was also prepared. These two plasticized compositions were then mixed together in the proportion of 95:5. This mixture was pelletized and fed into an extruder-die system of the usual type, except that the bore of the extruder barrel used was 2 inches.

The extrusion was accomplished under the following conditions:

| | |
|---|---:|
| Extruder speed _____ r.p.m__ | 60 |
| Temperatures: | |
|   Hopper _____ °F__ | 50 |
|   Heater zone I _____ °F__ | 370 |
|   Heater zone II _____ °F__ | 400 |
|   Die ring heater _____ °F__ | 400 |
|   Die collar heater _____ °F__ | 400 |
| Die slot opening _____ mils__ | 25 |
| Blow-up ratio _____ | 4.2 |
| Film thickness (double layer) _____ mils__ | 3.0 |
| Cooling air pressure _____ in. water__ | 2.0 |
| Wind-up speed _____ ft./min__ | 30 |

There was thus obtained a film with a low coefficient of friction which is more readily machinable than other films so far produced, and which is capable of giving better aqueous seals during packaging operations.

*Example 6*

A composition consisting of 100 parts by weight of a polyvinyl alcohol containing 35% of residual acetate groups, calculated as polyvinyl acetate, and having a 4% aqueous solution viscosity of about 10 centipoises at 20° C., 15 parts of Pycal 94, 10 parts of triethylene glycol, 0.5 part of butylated hydroxytoluene and 0.2 part of a commercial slip agent called "Strip-eze."

The composition was extruded at a melt temperature of 350° F. on a two-inch Hartig extruder equipped with a side entry four inch blow die. The blow-up ratio was 3:1 and the take-off speed was set at 30 feet per minute. A back pressure of 4500 p.s.i. was maintained.

A 1.7 mil film was produced which has a tendency to block and showed poor low temperature-low humidity properties; it broke on impact at −4° F.

*Example 7*

The formulation used in this run was that of Example 6 except that 30 parts per hundred parts of resin (p.h.r.) of Pycal 94 were employed and the triethylene glycol was replaced by 7.7 p.h.r. of Atlas Powder's G2320, a polyoxyethylene derivative of sorbitol. The following process conditions were also changed; extrusion temperature, 390° F., back pressure, 6500 p.s.i.; blow-up ratio, 4.5:1 and take-off speed, 25 feet per minute. A 1.7 mil film was obtained and found satisfactory in all respects, its low temperature-low humidity breaking point being −36° F.

Example 8

Again the formulation, equipment and technique of Example 6 were used, except for the following changes: 15 p.h.r. Pycal 94, 10 p.h.r. Carbowax 600—a polyethylene glycol with a molecular weight of 600, the Slip-eze was eliminated. Satisfactory film, i.e. with low temperature-low humidity breaking point of −30° F., was obtained at a melt temperature of 405° F., a back pressure of 7000 p.s.i., a blow-up ratio of 2.5:1 and a take-off speed of 40 feet per minute.

Example 9

A composition consisting of 100 parts of a polyvinyl alcohol having a residual acetate content of 36% by weight, calculated as polyvinyl acetate, and a 4% aqueous solution viscosity of 10.5 centipoises at 20° C., 30 parts of trimethylol propane, 0.2 part of butylated hydroxytoluene and 0.5 part of a slip agent ("RAM"), was extruded and blown under the following conditions: melt temperature 365° F.; back pressure, 7000 p.s.i.; blow-up ratio, 4:1, and take-off speed, 20 feet per minute. The screen pack used to provide the back pressure consisted of units of the following mesh: 20, 40, 60, 60, 40 and 20.

The film produced was tacky. It had good chlorine resistance.

The permissible limits of the process variables that have not yet been discussed will now be summarized.

The extruder, for instance, can in itself be run at any speed which will not overload the drive and will yet subject the plastic material to sufficient working. Like the other factors already mentioned, it is obvious that the actual extruder speed selected is in practice also a function of the melt viscosity of the materials to extrude, the capacity of the die, the wind-up speed, etc.

The take-off or wind-up speed in conjunction with the back pressure developed by the die, screen pack, screw design etc. the extruder speed and the blow-up ratio, govern the thickness of the film desired. This wind-up speed, in general, should be slow enough to effect the desired draw on the molten film. As to die opening, too small an opening will trap impurities and gel specks in the slot and cause streaking on the film. Too large an opening, on the other hand, will require a very rapid take-off to get draw to the desired thickness and this in turn will cause cooling and handling problems. The range of 10 to 40 mils was found satisfactory for the size and design of the equipment used in this invention. The blow-up ratio is governed naturally by the machine limitations as well as by the width, the thickness and the final properties of the film desired. The effect of variation of blow-up ratio on film properties is rather important in that by coordinating this ratio with the film wind-up speed and the rate of bubble cooling, the stretching and molecular orientation of the plastic material can be controlled to give the film strength in either or both longitudinal and transverse directions. Balanced or unbalanced film can thus be obtained, depending on the use intended for the film. The magnitude of the blow-up ratio also affects the low temperature-low relative humidity behavior of the product. In this respect, it has been found that although blow-up ratios within the range of about 1.5:1 to 5:1 may be used, blow-up ratios of about 3.8:1 give, with the preferred extrudable compositions of this invention, the most flexible film under such conditions, as determined by a shattering-on-impact test. This test correlates the relevant film properties to standard shipping tests in ascertaining that the film products can stand shipping and handling without breaking and this under all possible conditions found in commerce. The present film products will in fact retain satisfactory impact properties at temperatures ranging as low as −30° F. to −45° F. and under conditions of relative humidity so low that the actual moisture content of the films is almost insignificant. It is not inconceivable to make film with the compositions taught herein by extruding onto chill rolls. A good antioxidant would be required in such a case because of the higher temperatures e.g. to about 460° F., that the process requires.

The water soluble films of this invention may be used for packaging of soaps, detergents, bleaches, dyes, foods, etc. They may also serve as soluble laminates for decals. They also make excellent organic solvent impermeable barriers for lining hoses, tanks and similar structures.

It is not intended to limit this invention to the production of films made from a mixture of polyvinyl alcohol, plasticizer, antioxidant and slip agent only. Obviously, acceptable films may be produced by those skilled in the art which contain pigments, pigment extenders, dyes and other inert materials. It is to be understood therefore that this invention is not to be limited except by the scope of the appended claims.

What is claimed is:

1. A dry blow-extrudable polyvinyl alcohol composition capable of yielding thin, clear, uniform, water soluble seamless tubing, comprising: (A) a polyvinyl alcohol having a melting point within the range of about 375 to about 425° F. a residual acetate group content of 25 to 40% by weight, calculated as polyvinyl acetate, and a 4% aqueous solution viscosity of 4 to about 45 centipoises at 20° C., said polyvinyl alcohol being selected from the groups consisting of washed resins containing a maximum of 1.0% ash by weight and partially hydrolyzed polyvinyl acetates neutralized with a compound selected from the groups consisting of phosphoric acid, alkali metal phosphates, citric acid and malic acid; (B) 10 to 40 parts by weight per 100 parts of polyvinyl alcohol of a plasticizer which is a monophenyl ether of polyoxyethylene containing from 2 to about 7 ethylene oxide units per molecule, which plasticizer is completely compatible and is substantially non-volatile at the melting temperature of the polyvinyl alcohol; said plasticized polyvinyl alcohol composition containing not more than 0.5% by weight of moisture.

2. The composition of claim 1 wherein the polyvinyl alcohol resin is a phosphoric acid neutralized polyvinyl acetate hydrolyzate having a 4% aqueous solution viscosity of 4 to 12.5 centipoises at 20° C.

3. The composition of claim 2 wherein the plasticizer is the monophenyl ether of polyoxyethylene containing from 2 to about 7 and averaging about 4 ethylene oxide units per molecule.

4. The composition of claim 1 comprising between 0.2 and 2.0% by weight of an antioxidant selected from the groups consisting of butylated hydroxyanisole, butylated hydroxytoluene, sodium benzoate, calcium stearate, lactose and reducing salts of copper, nickel, cobalt and tin.

5. The composition of claim 1 comprising up to 2.0% by weight of a low molecular weight substantially incompatible slip agent.

6. A composition as in claim 1 comprising: 95 parts of a mixture of 100 parts of a polyvinyl alcohol resin containing about 37% by weight of residual acetate groups, calculated as polyvinyl acetate, and having a 4% aqueous solution viscosity of about 9 centipoises at 20° C. with 35 parts of the monophenyl ether of polyoxyethylene containing from 2 to about 7 and averaging about 4 ethylene oxide units per molecule, and 0.2 part of butylated hydroxytoluene; and 5 parts of another mixture comprising 100 parts of an essentially completely hydrolyzed polyvinyl acetate having a 4% aqueous solution viscosity of about 15 centipoises at 20° C., with 25 parts of dry glycerine and 1 part of butylated hydroxytoluene; all parts being by weight.

References Cited

UNITED STATES PATENTS 2,399,456   4/1946   Yates et al. _____ 260—36

(Other references on following page)

UNITED STATES PATENTS

| | | | |
|---|---|---|---|
| 2,351,301 | 6/1944 | Sonnicksen | 260—36 |
| 2,850,471 | 9/1958 | Klein | 260—33.2 |
| 2,850,489 | 9/1958 | Turnbull | 260—91.3 |
| 2,889,297 | 6/1959 | Brandner | 260—33.2 |
| 2,950,271 | 8/1960 | Snyder | 260—91.3 |
| 3,207,823 | 9/1965 | Glyde et al. | 264—95 |
| 3,218,380 | 11/1965 | Euling et al. | 264—95 |

OTHER REFERENCES

Mellan: Industrial Plasticizers, The Macmillan Company, 1963, pages 122–123.

MORRIS LIEBMAN, *Primary Examiner.*

L. T. JACOBS, *Assistant Examiner.*